US010821941B2

(12) United States Patent
Numakunai

(10) Patent No.: US 10,821,941 B2
(45) Date of Patent: Nov. 3, 2020

(54) FOREIGN MATERIAL ADHESION PREVENTING DEVICE AND CAMERA DEVICE PROVIDED WITH SAME

(71) Applicant: MITSUMI ELECTRIC CO., LTD., Tokyo (JP)

(72) Inventor: Takayuki Numakunai, Tokyo (JP)

(73) Assignee: Mitsumi Electric Co., Ltd., Tokyo (JP)

(*) Notice: Subject to any disclaimer, the term of this patent is extended or adjusted under 35 U.S.C. 154(b) by 217 days.

(21) Appl. No.: 15/740,226

(22) PCT Filed: Jun. 29, 2016

(86) PCT No.: PCT/JP2016/069231
§ 371 (c)(1),
(2) Date: Dec. 27, 2017

(87) PCT Pub. No.: WO2017/006818
PCT Pub. Date: Jan. 12, 2017

(65) Prior Publication Data
US 2018/0194328 A1 Jul. 12, 2018

(30) Foreign Application Priority Data
Jul. 7, 2015 (JP) .................................. 2015-136223

(51) Int. Cl.
*B60S 1/52* (2006.01)
*G03B 17/02* (2006.01)
(Continued)

(52) U.S. Cl.
CPC . *B60S 1/52* (2013.01); *B60S 1/56* (2013.01); *G02B 27/0006* (2013.01);
(Continued)

(58) Field of Classification Search
CPC .......... B60S 1/52; B60S 1/56; G02B 27/0006; B08B 3/02; G03B 17/02; G03B 17/08; H04N 5/2251
See application file for complete search history.

(56) References Cited

U.S. PATENT DOCUMENTS 4,285,470 A * 8/1981 Roth .................... B60Q 1/0017
15/250.002
8,442,604 B1 * 5/2013 Diebel .................. G03B 17/02
455/575.8
(Continued)

FOREIGN PATENT DOCUMENTS

JP 2003-175767 A 6/2003
JP 2004-164143 A 6/2004
(Continued)

OTHER PUBLICATIONS

Japanese Office Action dated Mar. 20, 2019 with English Translation.

*Primary Examiner* — Qingzhang Zhou
(74) *Attorney, Agent, or Firm* — W & C IP

(57) ABSTRACT

A foreign material adhesion preventing device (30) that is mounted on a camera main body (20) having an image capturing surface (211a) exposed to external surroundings for preventing foreign material from adhering to the image capturing surface (211a) has a cover (32) having a cover member (322) configured to cover the image capturing surface (211a) and a nozzle (34) for spraying a fluid towards an outer surface (322b) of the cover member (322). This can provide the highly versatility foreign material adhesion preventing device (30) that can prevent foreign material from adhering directly to the image capturing surface (211a) of the camera main body (20).

13 Claims, 8 Drawing Sheets

(51) Int. Cl.
  H04N 5/225 (2006.01)
  B60S 1/56 (2006.01)
  G02B 27/00 (2006.01)
  B08B 3/02 (2006.01)
  G03B 17/08 (2006.01)

(52) U.S. Cl.
  CPC ........... G03B 17/02 (2013.01); H04N 5/2251 (2013.01); B08B 3/02 (2013.01); G03B 17/08 (2013.01)

(56) References Cited

U.S. PATENT DOCUMENTS

| | | | | |
|---|---|---|---|---|
| 8,861,951 B2 * | 10/2014 | Warren | ................. | G03B 17/02 |
| | | | | 396/541 |
| 2002/0005440 A1 * | 1/2002 | Holt | ................. | B60S 1/54 |
| | | | | 239/284.2 |
| 2011/0073142 A1 * | 3/2011 | Hattori | ................. | B60S 1/56 |
| | | | | 134/56 R |
| 2011/0292212 A1 | 12/2011 | Tanabe et al. | | |
| 2012/0117745 A1 | 5/2012 | Hattori et al. | | |
| 2014/0347625 A1 * | 11/2014 | Tomoda | ................. | C23C 14/083 |
| | | | | 351/159.57 |
| 2015/0029340 A1 * | 1/2015 | Taguchi | ................. | G02B 27/0006 |
| | | | | 348/151 |
| 2015/0040953 A1 * | 2/2015 | Kikuta | ................. | B60S 1/52 |
| | | | | 134/123 |
| 2015/0078940 A1 | 3/2015 | Kikuta et al. | | |

FOREIGN PATENT DOCUMENTS

| | | | |
|---|---|---|---|
| JP | 2012-175359 A | | 9/2012 |
| JP | 2013-154771 A | | 8/2013 |
| JP | 2013154771 | * | 8/2013 |
| JP | 2014-127930 A | | 7/2014 |
| JP | A-2015-057338 A | | 3/2015 |
| JP | 2015-083830 A | | 4/2015 |

* cited by examiner (A)

(B)

FOREIGN MATERIAL ADHESION PREVENTING DEVICE AND CAMERA DEVICE PROVIDED WITH SAME

TECHNICAL FIELD

The present invention relates to a foreign material adhesion preventing device and particularly to a device configured to prevent foreign material such as rain drops, dust and mud from adhering to a lens portion (an image capturing surface) of a camera device (a camera main body) such as an onboard camera that is attached to an external portion of a vehicle.

BACKGROUND ART

An onboard camera that is a back monitoring camera is set at a lower portion a spoiler of a vehicle body, in a depressed portion on the circumference of a license plate, at an upper portion of a rear gate or on a flat surface of the rear gate. In addition, for example, an onboard camera that is a surroundings monitoring camera is also attached to a bottom surface of a door mirror (a side outside rearview mirror). These onboard cameras are set on the external portions of the vehicle body and hence needs to keep dustproofness and waterproofness.

In particular, foreign material such as rain drops, dust and mud often adhere to a lens portion (an image capturing surface) of an onboard camera. Then, it has been conventional practice to remove foreign material from the lens portion (the image capturing surface) of the onboard camera by jetting a fluid like a liquid such as a washing liquid on to the lens portion (the image capturing surface).

For example, Patent Literature 1 discloses a "washer nozzle attached onboard camera" including a camera main body having a housing and a lens (an image capturing opening portion in an image capturing surface) that is provided on the housing and a camera nozzle for supplying a washing liquid towards the lens (the image capturing opening portion in the image capturing surface).

PRIOR ART LITERATURE

Patent Literature

Patent Literature 1: JP-A-2012-175359

SUMMARY OF THE INVENTION

Problem to be Solved

Patent Literature 1 described above has the following problems.

In the washer nozzle attached onboard camera disclosed in Patent Literature 1, the shape of the camera nozzle has to be designed so as to match an external shape of the camera main body. In particular, the position (the angle) of a discharge portion (a discharge port) of the nozzle needs to be adjusted so that a liquid such as a washing liquid is supplied appropriately towards the image capturing opening portion in the image capturing surface of the camera main body. In other words, the washer nozzle attached onboard camera disclosed in Patent Literature 1 has a problem in that the washer nozzle attached onboard camera lacks the general purpose properties.

In the washer nozzle attached onboard camera disclosed in Patent Literature 1, a liquid such as a washing liquid is discharged directly towards the image capturing opening portion in the image capturing surface of the camera main body that is exposed to external surroundings. This leaves the image capturing surface (the image capturing opening portion) of the camera main body wetted with the liquid after the liquid has been discharged. As a result, the onboard camera disclosed in Patent Literature 1 has also a problem in that dust or the like adheres again to the wet image capturing surface (the image capturing opening portion). To solve this problem, the liquid needs to be kept discharged continuously or be discharged at short intervals at all times. As this occurs, however, a further problem is caused in that the washing liquid has to be supplied frequently.

Consequently, an object of the invention is to provide a highly versatility foreign material adhesion preventing device that can prevent foreign material from adhering directly to an image capturing surface of a camera main body and a camera device including the foreign material adhesion preventing device.

Other objects of the invention will be made clear as a description of the invention progresses.

In the following description, words such as upward, upper end, upper portion and upper surface denote a side of a camera device (a camera main body) of the invention that faces an object to be captured on an optical axis O thereof, and words such as downward, lower end, lower portion and lower surface denote a side of the camera device (the camera main body) that faces an image capturing device on the optical axis O thereof.

Solution to Problem

To describe a gist of an illustrative mode of the invention, a foreign material adhesion preventing device is a device mounted on a camera main body having an image capturing surface exposed to external surroundings for preventing foreign material from adhering to the image capturing surface. The foreign material adhesion preventing device has a cover having a cover member for covering the image capturing surface and a nozzle for spraying a fluid towards an outer surface of the cover member.

According to another illustrative mode of the invention, a camera device is obtained that has the foreign material adhesion preventing device described above and a camera main body on which the foreign material adhesion preventing device is mounted.

Advantageous Effect of the Invention

The invention can provide the highly versatility foreign material adhesion preventing device that can prevent foreign material from adhering directly to the image capturing surface of the camera main body and the camera device including the foreign material adhesion preventing device.

BRIEF DESCRIPTION OF DRAWINGS

FIG. 10 illustrates a motor vehicle AM to which the camera device illustrated in FIG. 2 is attached as an onboard camera VC, in which FIG. 10(A) is a perspective view of the motor vehicle AM as seen from a rear side thereof, and FIG. 10(B) is a front view of the motor vehicle AM as seen from a front side thereof.

EMBODIMENT OF THE INVENTION

Referring to FIGS. 1 to 9, the constructions of a camera device 10 according to an embodiment of the invention and a foreign material adhesion preventing device 30 mounted on the camera device 10 will be described. As will be described later, the illustrated camera device 10 is an onboard camera that is used at a rear portion of a vehicle body as a back monitoring camera. The camera device 10 may be an onboard camera that is attached to a bottom surface of a door mirror (a side outside rear view mirror) mounted on the vehicle body for use as an external surroundings monitoring camera.

Figure 1:
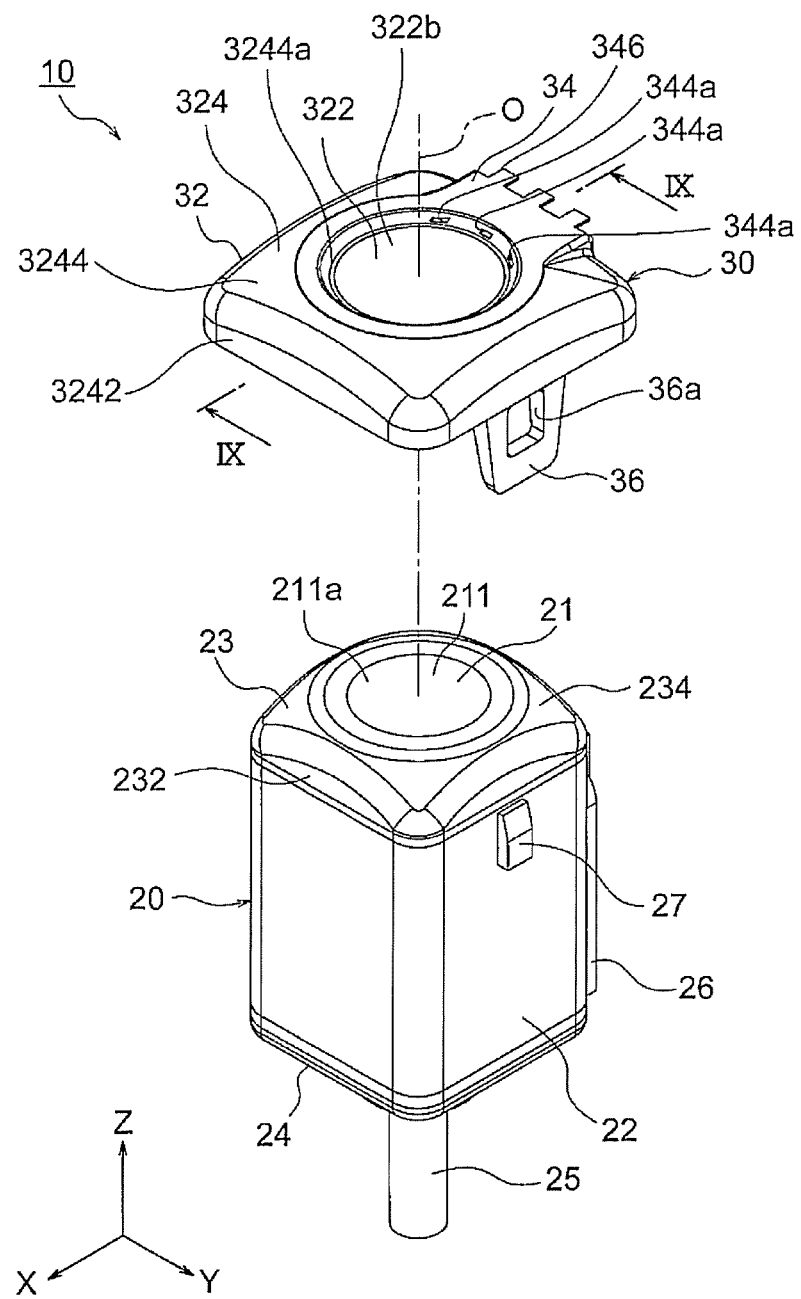
FIG. 1 is an exploded perspective view of a camera device according to an embodiment of the invention.
Figure 2:
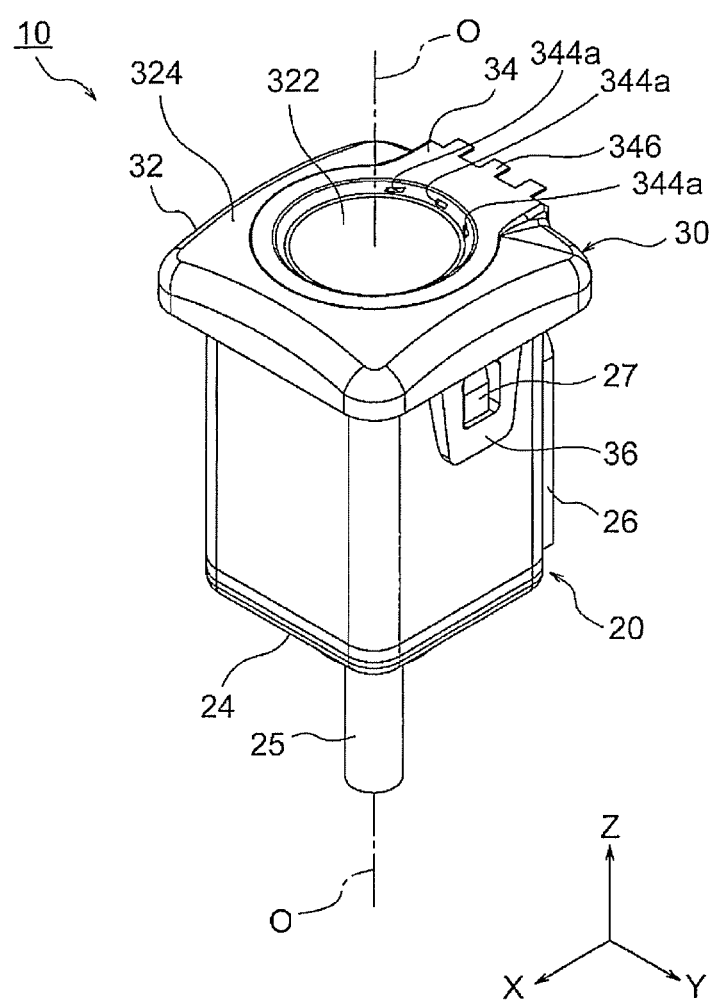
FIG. 2 is an external perspective view of the camera device illustrated in FIG. 1.
Figure 3:
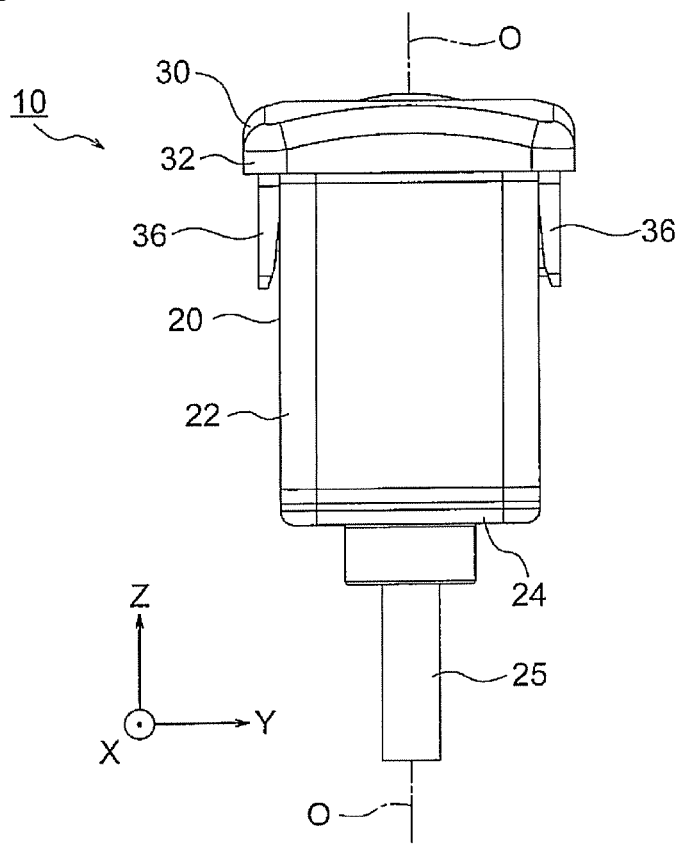
FIG. 3 is a front view of the camera device illustrated in FIG. 2.
Figure 4:
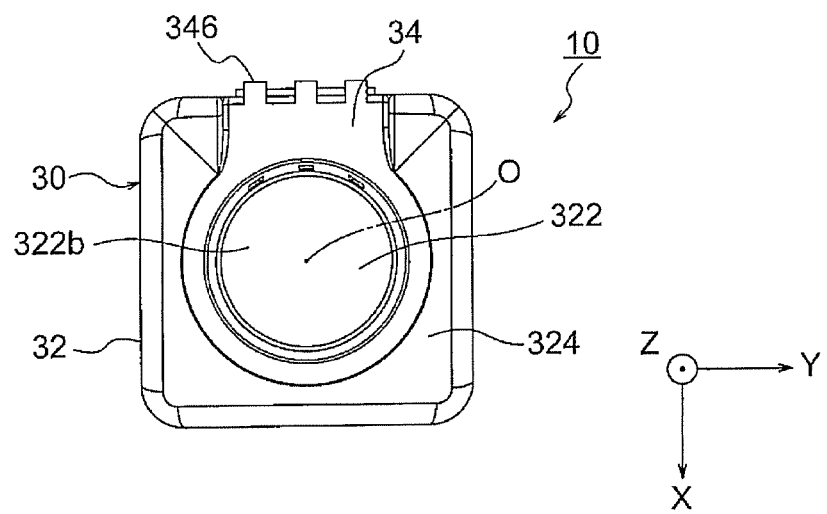
FIG. 4 is a plan view of the camera device illustrated in FIG. 2.
Figure 5:
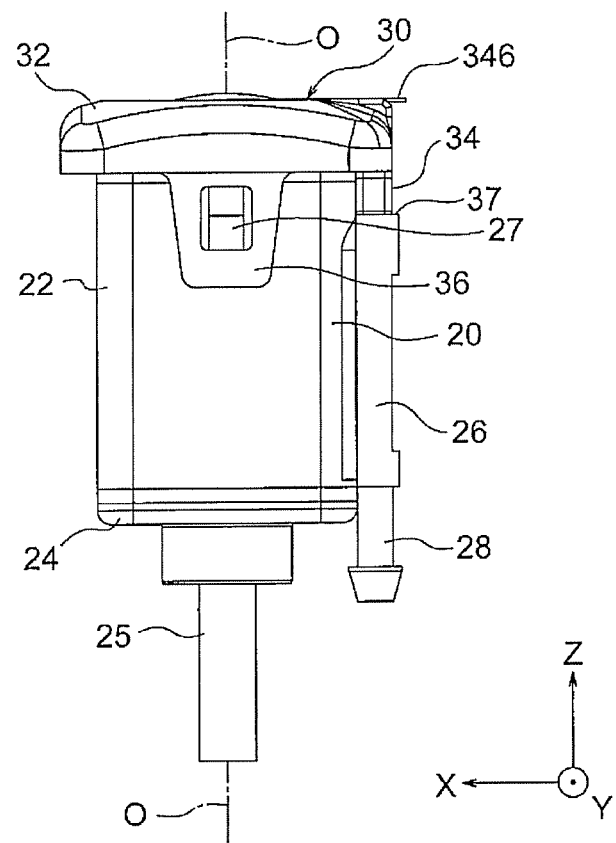
FIG. 5 is a right side view of the camera device illustrated in FIG. 2.
Figure 6:
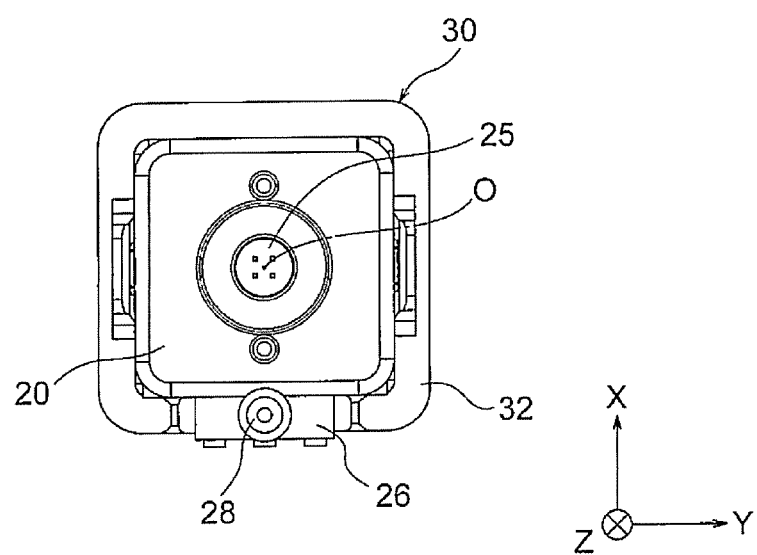
FIG. 6 is a bottom view of the camera device illustrated in FIG. 2.

FIG. 1 is an exploded perspective view of the camera device 10. FIG. 2 is an external perspective view of the camera device 10. FIG. 3 is a front view of the camera device 10. FIG. 4 is a plan view of the camera device 10. FIG. 5 is a right side view of the camera device 10. FIG. 6 is a bottom view of the camera device 10.

Figure 7:
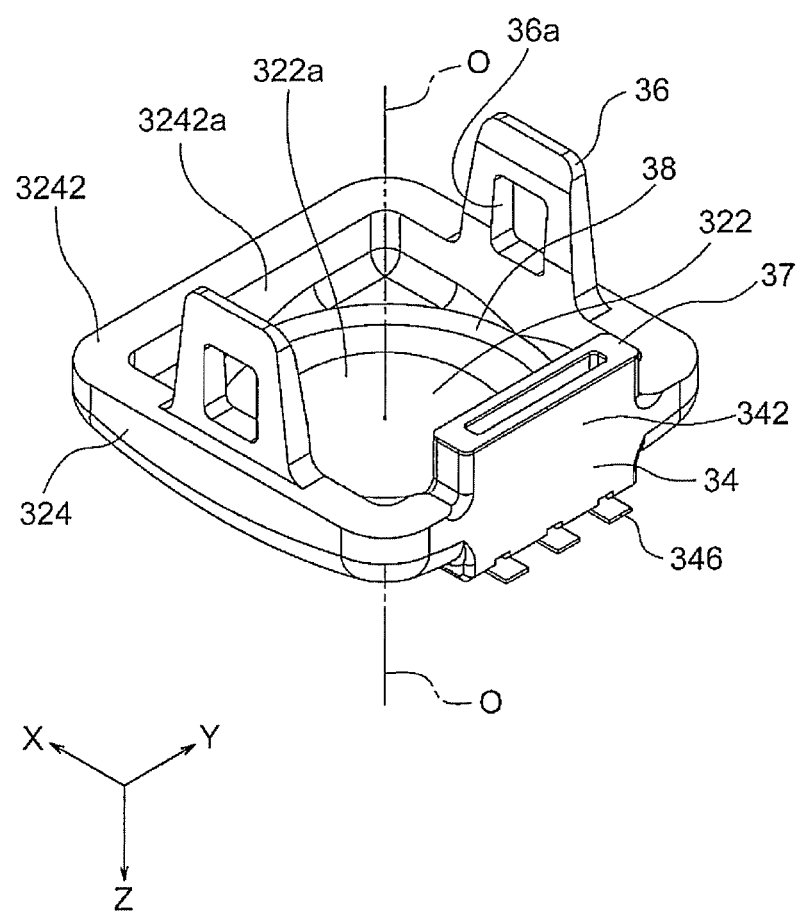
FIG. 7 is a perspective view of a foreign material adhesion preventing device as seen from a bottom side thereof that is used on the camera device illustrated in FIG. 1.
Figure 8:
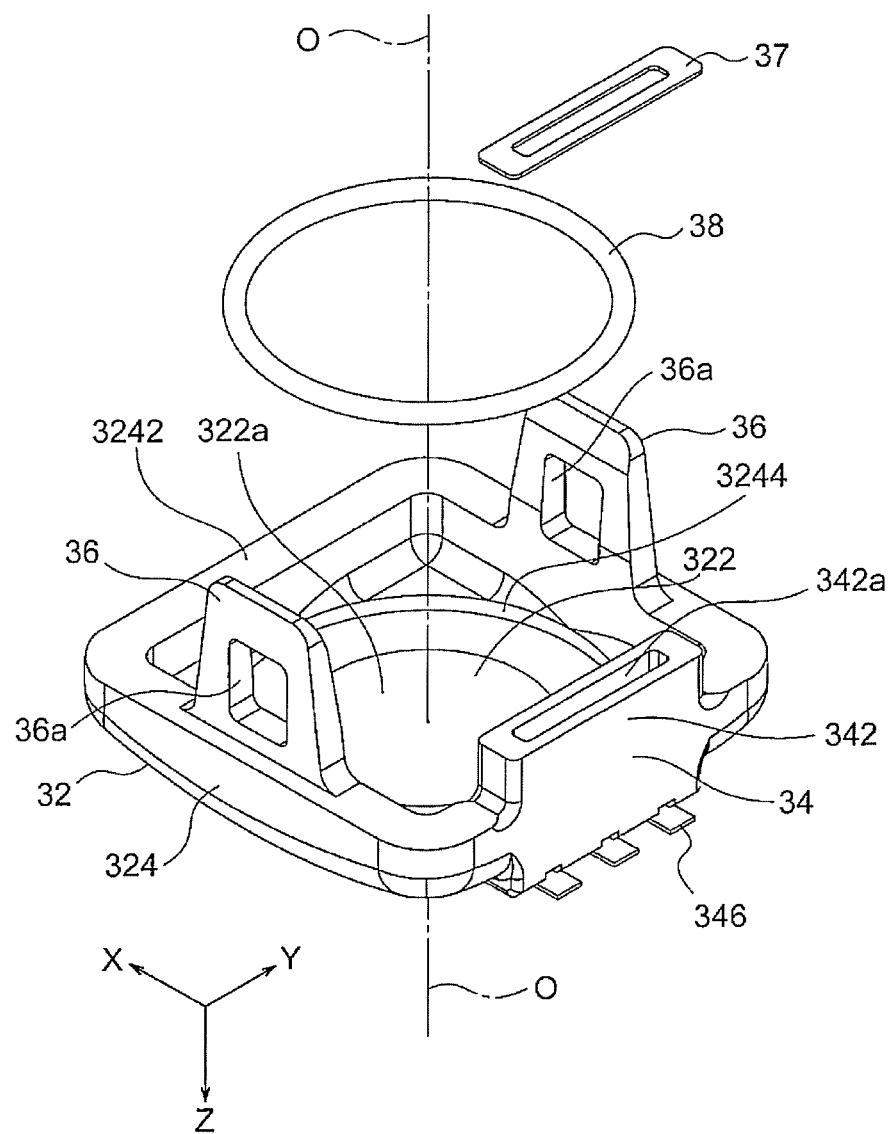
FIG. 8 is an exploded perspective view of the foreign material adhesion preventing device illustrated in FIG. 7.
Figure 9:
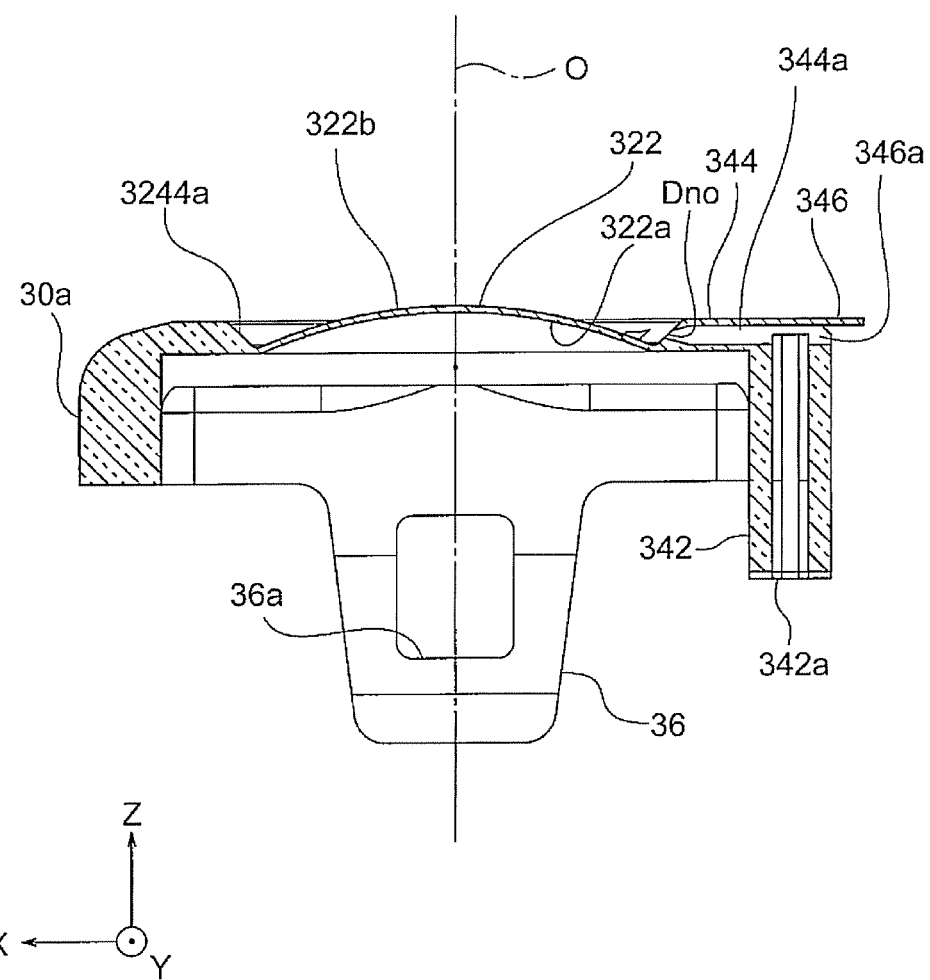
FIG. 9 is a sectional view taken along a line IX-IX in FIG. 1.

In addition, FIG. 7 is a perspective view of the foreign material adhesion preventing device 30 as seen from a bottom side thereof, and FIG. 8 is an exploded perspective view of the foreign material adhesion preventing device 30. FIG. 9 is a sectional view taken along a line IX-IX in FIG. 1.

Here, as shown in FIGS. 1 to 9, an orthogonal coordinates system (X, Y, Z) is used. In the states illustrated in FIGS. 1 to 9, in the orthogonal coordinates system (X, Y, Z), an X-axis direction denotes a front-to-rear direction (a depth direction), a Y-axis direction denotes a left-to-right direction (a width direction), and a Z-axis direction denotes an up-to-down direction (a height direction). Then, in an example shown in FIGS. 1 to 9, the up-to-down direction Z denotes the direction of an optical axis O of a lens. In the illustrated example, a further upward direction than the up-to-down direction Z indicates an area where an object to be captured (not illustrated) exists. In this embodiment, the Y-axis direction (the left-to-right direction) is also referred to as a first direction, and the X-axis direction (the front-to-rear direction) is also referred to as a second direction.

As shown in FIG. 1, briefly speaking, the illustrated camera device 10 is made up of two constituent elements. Namely, the camera device 10 is made up of a camera main body 20 and the foreign material adhesion preventing device 30.

Firstly, referring to FIG. 1, the configuration of the camera main body 20 will be described. The camera main body 20 has a lens group 21, a holding member 22 for holding this lens group 21, a retainer 23 that is provided at an upper end portion of the holding member 22, a sealing member 24 that is provided at a lower end portion of the holding member 22, and a cable 25 that extends from this sealing member 24 to an exterior portion. When referred to herein, "sealing" means closure of an opening.

The lens group 21 is made up of a plurality of lenses. In FIG. 1, in the plurality of lenses, only an uppermost top lens 211 is illustrated. In the illustrated lens group 21, each of the plurality of lenses has a circular external shape.

The holding member 22 has a substantially quadrangular cylindrical shape that extends in the up-to-down direction Z. An interior space of the holding member 22 is divided into a lens accommodating space where the lens group 21 is accommodated and a circuit board accommodating space where a circuit board unit (not illustrated) is accommodated. The holding member 22 has a retainer receiving surface (not illustrated) where the retainer 23 is received.

The retainer 23 is a member for preventing the entrance of water into an interior of the holding member 22. The retainer 23 is attached to an upper end of the holding member 22. The retainer 23 is made up of a substantially quadrangular cylindrical outer cylindrical portion 232 that extends in the up-to-down direction Z and a curved ring-shaped upper end portion 234 that is provided at an upper end of the outer cylindrical portion 232 so as to project obliquely upwards and inwards from the outer cylindrical portion 232. The upper end portion 234 has a substantially circular opening (not illustrated) that matches an external shape of the lens group 21.

The outer cylindrical portion 232 of the retainer 23 is received by the retainer receiving surface of the holding member 22. An upper surface 211a of the uppermost top lens 211 of the lens group 21 is exposed from the opening of the upper end portion 234 of the retainer 23. Namely, the retainer 23 is attached to the upper end portion of the holding member 22 so as to surround an outer circumferential edge of the top lens 211 with the upper surface 211a of the top lens 211 exposed.

Consequently, the illustrated camera main body 20 has the upper surface 211a of the top lens 211 as an image capturing surface exposed to external surroundings.

In this embodiment, the image capturing surface that is exposed to the external surroundings is made up of the upper surface 221a of the top lens 211. However, the invention is not limited thereto. For example, the image capturing surface that is exposed to the external surroundings may be an image capturing opening portion as described in Patent Literature 1 described above.

Although not illustrated, the circuit board unit includes a sensor circuit board and a power supply circuit board. An image capturing device is mounted on the sensor circuit board. The image capturing device captures an object image which is formed by the lens group 21 and converts it into an electric signal. The image capturing device is made up, for example, of a Charge Coupled Device (CCD) type image sensor or a Complementary Metal Oxide Semiconductor (CMOS) type image sensor. The sensor circuit board and the power supply circuit board are fitted together via an inter-circuit board connector. A leading end portion of the cable 25 is electrically connected to the power supply circuit board through soldering or the like.

As is obvious from the description that has been made heretofore, the illustrated camera main body 20 has a substantially quadrangular prism-like external shape. Here, it should be noted that a camera device like an onboard camera generally marketed has a substantially quadrangular prism-like external shape like the external shape of the camera main body 20 illustrated in FIG. 1. Namely, it should be noted that although generally marketed camera devices often differ in height dimension from one another, they have substantially the same longitudinal and lateral dimensions.

A combination of the holding member 22, the retainer 23 and the sealing member 24 works as a housing of the camera main body 20.

As shown in FIG. 5, the camera main body 20 has further a supply pipe 26 for supplying a fluid to a nozzle 34 of the foreign material adhesion preventing device 30, which will be described later. In the illustrated example, the supply pipe 26 is provided at the rear of the holding member 22 so as to extend in the up-to-down direction Z. The supply pipe 26 is made up of a rectangular pipe which is wider in the left-to-right direction (the first direction) Y. In the illustrated example, the fluid is air.

A substantially cylindrical inserting portion 28 is provided at a lower end portion of the supply pipe 26 so as to project therefrom. One end of a hose, not illustrated, is fitted over the inserting portion 28. An air supply source like a pump, not illustrated, is connected to the other end of the hose. It should be noted that the fluid is not limited to air, and hence, the fluid may be a liquid such as a washing liquid.

As shown in FIG. 1, the camera main body 20 has a pair of projecting portions (protuberant portions) 27 (however, in FIG. 1, only a right projecting portion is illustrated) that project outwards in positions lying close to the retainer 23 on both side surface of the holding member 22 in the left-to-right direction (the first direction) Y. Holes (depressed portions) 36a of a pair of fasteners 36 of the foreign material adhesion preventing device 30, which will be described later, are fitted on the pair of projecting portions 27. Consequently, a combination of the pair of projecting portions 27 of the camera main body 20 and the fasteners 36 of the foreign material adhesion preventing device 30 works as a snap fit. Adopting this configuration can facilitate the attachment of the foreign material adhesion preventing device 30 to the camera main body 20. In other words, adopting the snap-fit configuration can improve the efficiency of the attaching work of attaching the foreign material adhesion preventing device 30 to the camera main body 20.

In the illustrated embodiment, although the snap fit is made by providing the projecting portions 27 on the camera main body 20 while the depressed portions 36a are provided on the foreign material adhesion preventing device 30, the projecting portions and the depressed portions may be provided on the other way around. Namely, the snap fit may be made by providing depressed portions on the camera main body 20 and providing protuberant portions on the foreign material adhesion preventing device 30.

In this way, the fasteners 36 of the foreign material adhesion preventing device 30 work as attaching members for attaching the foreign material adhesion preventing device 30 to the camera main body 20.

Next, referring to FIGS. 1 to 9, the foreign material adhesion preventing device 30 will be described that is mounted on the camera main body 20.

The foreign material adhesion preventing device 30 is mounted on the camera main body 20 having the image capturing surface 211a that is exposed to the external surroundings for use. The foreign material adhesion preventing device 30 is a device for preventing foreign material from adhering to the image capturing surface 211a. When referred to herein, foreign material are, for example, rain drops, insects, dust, mud, and the like.

The foreign material adhesion preventing device 30 has a cover having a cover member 322 that covers the image capturing surface 211a and a nozzle 34 for spraying a fluid towards an outer surface 322b of the cover member 322. As has been described above, in the illustrated example, the fluid is air. Here, air may be sprayed continuously against the outer surface 322b of the cover member 322, or air may be sprayed continuously against the outer surface 322b of the cover member 322 only for a predetermined period of time when a switch (not illustrated) provided inside a passenger compartment is depressed.

The illustrated cover member 322 has a circular shape when seen from top as illustrated in FIG. 4 and is formed into a thin film. Thus, the cover member 322 is also called a cover film. A diameter of the cover member 322 is greater than a diameter of the top lens 211 (the image capturing surface 211a) of the camera main body 20.

The cover 32 has a circumferential portion 324 that is provided radially outwards of the cover member 322. The circumferential portion 324 is made up of a quadrangular cylindrical mount portion 3242 and an upper end holding portion 3244. The quadrangular cylindrical mount portion 3242 has a substantially rectangular opening 3242a whose dimension is substantially equal to an external shape (dimension) of the holding member 22 of the camera main body 20, as illustrated in FIG. 7 and is mounted on the holding member 22 of the camera main body 20. The upper end holding portion 3244 is provided between the mount portion 3242 and the cover member 322 to hold the cover member (cover film) 322.

On the other hand, as illustrated in FIGS. 8 and 9, the nozzle 34 has an introduction pipe 342 having an introduction port 342a having an opening shape that is substantially the same as that of a supply port of the supply pipe 26 and a discharge portion 344 provided at a leading end portion of the introduction pipe 342. The introduction pipe 342 is made up of a rectangular pipe that extends in the up-to-down direction Z on a back side of the holding member 22 of the camera main body 20. On the other hand, the discharge portion 344 has three injection holes 344a (refer to FIG. 1) that extend in the front-to-rear direction X.

As shown in FIGS. 5, 7 and 8, the foreign material adhesion preventing device 30 includes a gasket 37 that is mounted between the introduction port 342a of the introduction pipe 342 and the supply port of the supply pipe 26. The gasket 37 is attached to the introduction port 342a and the supply port by the use of, for example, a pressure sensitive adhesive double coated tape. This ensures airtightness between the introduction pipe 342 and the supply pipe 26.

In the foreign material adhesion preventing device 30 of this example, the cover 32, the nozzle 34 and the pair of fasteners 36 are formed into an integral unit. Specifically, the cover 32, the nozzle 34 and the pair of fasteners 36 are formed into an integral unit from a resin through injection molding.

In injection molding the cover 32, the nozzle 34 and the pair of fasteners 36 into an integral unit, three openings 346a (however, in FIG. 9, only one opening 346a is illustrated) are formed in a flow path of the nozzle 34 (in the case of this example, a flow path connecting the three injection holes 344a of the discharge portion 344 and the introduction pipe 342) as illustrated in FIG. 9. Additionally, during this injection molding, three resin pieces 346 are also formed so as to be close to the three openings 346a. Then, in the foreign material adhesion preventing device 30 of this example, the three openings 346a are closed by fusion bonding the three resin pieces 346 over the openings 346a.

In the foreign material adhesion preventing device 30 of this example, although the three openings 346a are closed using the fusion bonding method, the three openings 346a may be closed using other methods than the fusion bonding method. For example, the three openings 346a may be closed by sealing the three openings 346a with a resin without forming the three resin pieces 346. Alternatively, the three openings 346a may be closed by inserting three resin products into the three openings 346a and then bonding them to the openings 346a.

In addition, in the foreign material adhesion preventing device 30 of this example, the resin from which the foreign material adhesion preventing device 30 is formed is a transparent resin. For example, an acrylic resin, a polycarbonate resin or the like can be used as the transparent resin.

Further, in the foreign material adhesion preventing device 30 of this example, an outer wall surface of the transparent resin from which the foreign material adhesion preventing device 30 is formed is painted with a paint material 30a made up of a material that cuts off the transmission of light excluding the cover member 322. This can prevent light from entering the image capturing surface 211a of the camera main body 20 from other portions than the cover member 322. This can prevent the generation of ghost and flare in an image captured by the image capturing device of the camera main body 20. In addition, in the foreign material adhesion preventing device 30 of this example, a reflection preventing film 322a is formed on an inner surface of the cover member 322 that faces the image capturing surface 211a of the camera main body 20. This can also prevent the generation of ghost and flare in an image captured by the image capturing device of the camera main body 20.

As illustrated in FIG. 9, the cover member 322 is provided one step lower than the upper end holding portion 3244 that lies on the circumference of the cover member 322. This can prevent the adhesion of insect, dust, mud and the like to the outer surface 322b of the cover member 322.

In addition, as illustrated in FIG. 9, the illustrated cover member 322 has a curved surface that projects outwards. This ensures a field of view (FOV) or an angle of view (AOV) of the camera main body 20. Further, a portion of the cover member 322 that is lowered one step from the circumferential upper end holding portion 3244 is chamfered to thereby form a chamfered portion 3244a. This also ensures the field of view or the angle of view of the camera main body 20.

As illustrated in FIGS. 7 and 8, the foreign material adhesion preventing device 30 has further an O ring 38 that is mounted between an inner wall of the circumferential portion 324 of the cover 32 and an outer wall of the camera main body 20. This can close a space (a gap) defined between the camera main body 20 and the cover 32 of the foreign material adhesion preventing device 30 in a sealed fashion. This can prevent the intrusion of water into the gap between the camera main body 20 and the cover 32.

In the foreign material adhesion preventing device 30 of this example, a nozzle output diameter Dno at a leading end of the nozzle 34 (that is, leading ends of the three injection holes 344a of the discharge portion 344) is constricted. Adopting this construction provides an advantageous effect of enhancing the flow velocity of air that is jetted from the injection ports 344a towards the image capturing surface 211a of the camera main body 20.

By adopting this construction, since the leading ends of the injection holes 344a slant less relative to the outer surface 322b of the cover member 322, a jet of fluid arrives at the chamfered portion 3244a that is situated opposite to the injection holes 344a without being separated from the outer surface 322b of the cover member 322 by the Coanda effect in which the jet of fluid travels along a surface configuration of the outer surface 322a. In other words, in the fluid emerging from the injection holes 344a, there are few separating components that scatter from the outer surface 322b of the cover member 322, and hence, most of the jetted fluid can contribute to the removal of foreign material, resulting in a high removal efficiency of foreign material.

Further, in the foreign material adhesion preventing device 30 of this example, a water repellant treatment is applied to the outer surface 322b of the cover member 322. This can repel rain drops from the outer surface 322b of the cover member 322 effectively that might otherwise adhere thereto.

As is obvious from what has been described heretofore, according to the embodiment of the invention, since the foreign material adhesion preventing device 30 includes the cover 32 that covers the image capturing surface 211a of the camera main body 20, it is possible to prevent a direct adhesion of foreign material to the image capturing surface 211a. Additionally, since the foreign material adhesion preventing device 30 is configured so that a generally marketed camera device can easily be mounted thereon, the general purpose properties of the foreign material adhesion preventing device 30 can be improved. In addition, when air is used as the fluid, compared with a case where a liquid like a washing liquid is used as the fluid, it is possible not only to eliminate labor hours spent resupplying such a liquid but also to prevent re-adhesion of dust.

Figure 10:
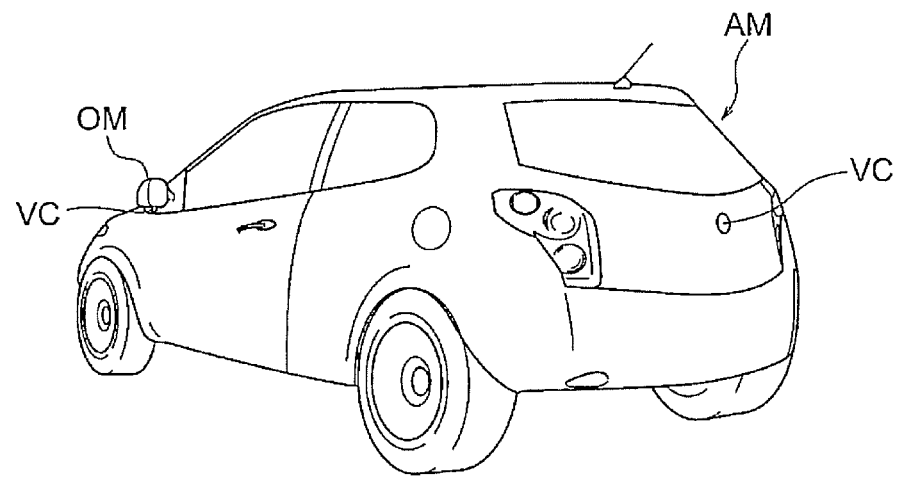
Figure 10:
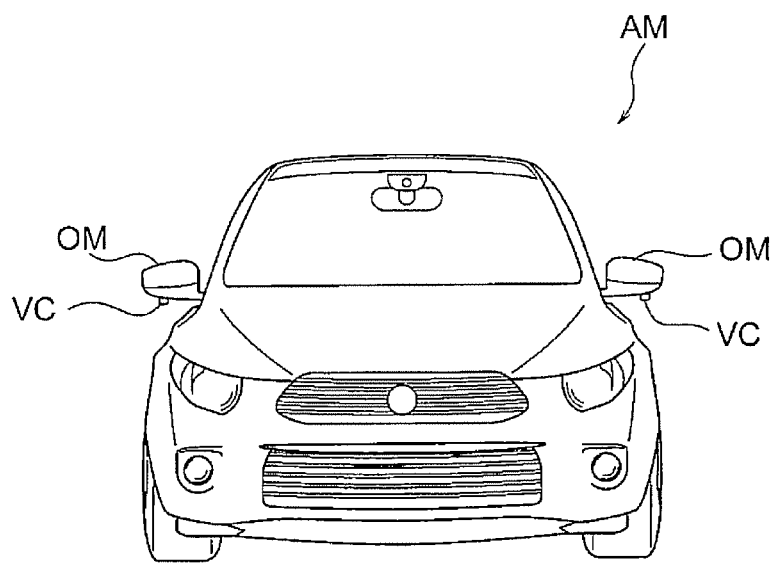

FIG. 10 illustrates a motor vehicle AM to which the camera device 10 is attached as an onboard camera VC. FIG. 10(A) is a perspective view of the motor vehicle AM as seen from a rear side thereof, and FIG. 10(B) is a front view of the motor vehicle AM as seen from a front side thereof.

As illustrated in FIG. 10(A), the camera device 10 is attached to a rear portion of a vehicle body of the motor vehicle AM as a back monitoring camera VC using an attachment member (not illustrated).

In addition, as illustrated in FIGS. 10(A), 10(B), the camera device 10 is attached to a bottom surface of a door mirror (a side rearview mirror) OM of the motor vehicle AM as an external surroundings monitoring camera VC using an attachment member (not illustrated).

As illustrated in FIGS. 10(A), 10(B), in the event that a piece of flying stone hits the outer surface 322b of the cover member 322 to scratch it while the camera device 10 is attached to the motor vehicle AM for use, only the foreign material adhesion preventing device 30 should be replaced, and there is no need to replace the whole of the camera main body 20.

An illustrative embodiment of the invention will be described below.

According to an illustrative embodiment of the invention, there is provided a foreign material adhesion preventing device (30) configured to be mounted on a camera main body (20) having an image capturing surface (211a) exposed to external surroundings for use to thereby prevent adhesion of foreign material to the image capturing surface (211a), the foreign matter adhesion preventing device (30) having a cover (32) having a cover member (322) that covers the image capturing surface (211a) and a nozzle (34) configured to spray a fluid towards an outer surface (322b) of the cover member (322).

In the foreign material adhesion preventing device (30) described above, it is preferable that the cover (32) and the nozzle (34) are integrated into a single unit. In addition, it is more preferable that the cover (32) and the nozzle (34) are integrated into a single unit from a resin through injection molding. As this occurs, it is desirable that an opening (346a) formed in a flow path of the nozzle (34) during the injection molding is closed through any of fusion bonding, resin sealing and part bonding. It is preferable that the resin is made up of a transparent resin. As this occurs, it is desirable that an outer wall surface of the transparent resin is painted with a paint material (30a) that is made up of a material that cuts off the transmission of light excluding the cover member (322). Additionally, it is preferable that the cover member (322) is provided one step lower than the resin (324) situated on a circumference thereof. As this occurs, it is desirable that the cover member (322) has a curved surface and that a chamfered portion (3244a) is provided at a portion of the cover member (322) that is lowered one step.

It is preferable that the foreign material adhesion preventing device (30) has an attachment member (36) for attaching the foreign material adhesion preventing device (30) to the camera main body (20). In addition, the cover (32) may include a circumferential portion (324) that is provided on a circumference of the cover member (322) to be mounted on the camera main body (20). As this occurs, it is desirable that the foreign material adhesion preventing device (30) has further an O ring (38) that is mounted between an inner wall of the circumferential portion (324) of the cover (32) and an outer wall of the camera main body (20). In addition, the camera main body (20) may include a supply pipe (26) having a supply port for supplying the fluid to the nozzle (34), and the nozzle (34) may have an introduction pipe (342) having an introduction port (342a) into which the fluid is introduced. As this occurs, it is preferable that the foreign material adhesion preventing device (30) has further a gasket (37) that is mounted between the introduction port (342a) of the introduction pipe (342) and the supply port of the supply pipe (26). Further, it is preferable that the cover member (322) has a reflection preventing film (322a) that is formed on an inner surface of the cover member (322) that is opposite to the image capturing surface (211a). It is desirable that a nozzle output diameter (Dno) at a leading end of the nozzle (34) is constricted. Further, it is preferable that a water repellant treatment is applied to an outer surface (322b) of the cover member (322). It is desirable that the fluid is made up of air.

According to another illustrative embodiment of the invention, there is provided a camera device (10) having the foreign material adhesion preventing device (30) and a camera main body (20) on which the foreign material adhesion preventing device (30) is mounted.

It should be noted that the reference numerals in the parentheses are given to facilitate the understanding of the invention and denote only examples, and hence, the invention is not, of course, limited to those examples.

Thus, while the invention has been described heretofore by reference to the embodiment, the invention is not limited to the embodiment described above. Hence, various modifications that those skilled in the art to which the invention pertains can understand can be made to the configuration and details of the invention without departing from the spirit and scope of the invention.

For example, in the foreign material adhesion preventing device 30 according to the embodiment that has been described above, although the cover 32 and the nozzle 34 are integrated into the single unit, the cover 32 and the nozzle 34 may be separated from each other. In the foreign material adhesion preventing device 30 according to the embodiment that has been described above, although the cover 32 and the nozzle 34 are integrated into the single unit from the resin through injection molding, the method of forming the cover 32 and the nozzle 34 is not, of course, limited thereto. In the foreign material adhesion preventing device 30 according to the embodiment that has been described above, although the transparent resin is used as the resin, the whole of the foreign material adhesion preventing device 30 does not necessarily have to be formed from one type of transparent resin. For example, in the foreign material adhesion preventing device 30, only the cover member (the cover film) 322 may be formed from the transparent resin, while the other portions may be formed from a translucent resin. Further, in the foreign material adhesion preventing device 30 according to the embodiment that has been described above, although the nozzle 34 includes the three injection holes 344a, the number of injection holes is not limited thereto. For example, the number of injection holes 344a may be one, two or four or more.

This patent application is based upon and claims the benefit of priority from the prior Japanese Patent Application No. 2015-136223 filed on Jul. 7, 2015, the entire contents of which are incorporated herein by reference.

INDUSTRIAL APPLICABILITY

The camera device according to the invention is not limited to onboard cameras of motor vehicles and hence can be applied to cameras for use in other industrial fields (for example, a monitoring (guarding) field where an open air monitoring is required).

DESCRIPTION OF REFERENCE NUMERALS AND CHARACTERS 10 camera device (onboard camera)
20 camera main body
21 lens group
211 top lens
211a upper surface (image capturing surface)
22 holding member
23 retainer
232 outer cylindrical portion
234 upper end portion
24 sealing member
25 cable
26 supply pipe
27 projecting portion (protuberant portion)
28 inserting portion
30 foreign material adhesion preventing device
30a paint material
32 cover
322 cover member (cover film)
322a reflection preventing film
322b outer surface
324 circumferential portion
3242 mount portion
3242a substantially rectangular opening
3244 upper end holding portion
3244a chamfered portion
34 nozzle
342 introduction pipe
342a introduction port
344 discharge portion
344a injection hole
346 resin piece
346a opening
36 fastener (attachment member)
36a hole (depressed portion)
37 gasket
38 O ring
Dno nozzle output diameter
AM motor vehicle OM door mirror (side outside rearview mirror)
VC onboard camera
O optical axis
X front-to-rear direction (second direction)
Y left-to-right direction (first direction)
Z up-to-down direction.

The invention claimed is:

1. A foreign material adhesion preventing device configured to be mounted on a camera main body having an image capturing surface exposed to external surroundings for preventing adhesion of foreign material to the image capturing surface, the foreign material adhesion preventing device comprising: a cover including: a cover member that is opposed to the image capturing surface and entirely covers the image capturing surface; and a circumferential portion that is provided on a circumference of the cover member, a fastener for attaching the foreign material adhesion preventing device to the camera main body, the fastener extending from the circumferential portion toward the camera main body; and a nozzle configured to spray a fluid towards an outer surface of the cover member, wherein the cover and the nozzle are integrated into a single unit from a resin, and wherein an opening formed in a flow path of the nozzle is closed, wherein a chamfered portion is provided at a portion of the cover member that is lowered one step wherein the chamfered portion is provided with an injection hole of the nozzle.

2. The foreign material adhesion preventing device according to claim 1, wherein
the resin is made up of a transparent resin.

3. The foreign material adhesion preventing device according to claim 2, wherein an outer wall surface of the transparent resin other than the cover member is painted with a paint material that is made up of a material that cuts off a transmission of light.

4. The foreign material adhesion preventing device according to claim 1, wherein
the cover member is provided one step lower than the resin situated on the circumference of the cover member.

5. The foreign material adhesion preventing device according to claim 4, wherein
the cover member has a curved surface shape.

6. The foreign material adhesion preventing device according to claim 1, wherein
the foreign material adhesion preventing device further comprises an O ring that is mounted between an inner wall of the circumferential portion of the cover and an outer wall of the camera main body.

7. The foreign material adhesion preventing device according to claim 1, wherein
the camera main body includes a supply pipe having a supply port for supplying the fluid to the nozzle,
the nozzle has an introduction pipe having an introduction port, the fluid being introduced into the introduction port, and
the foreign material adhesion preventing device further comprises a gasket that is mounted between the introduction port of the introduction pipe and the supply port of the supply pipe.

8. The foreign material adhesion preventing device according to claim 1, wherein
a reflection preventing film that is opposite to the image capturing surface is formed on an inner surface of the cover member.

9. The foreign material adhesion preventing device according to claim 1, wherein a nozzle output diameter at a leading end of the nozzle is constricted.

10. The foreign material adhesion preventing device according to claim 1, wherein
either a water repellant treatment or a hydrophilic treatment is applied to an outer surface of the cover member.

11. The foreign material adhesion preventing device according to claim 1, wherein
the fluid is made up of air.

12. A camera device comprising:
the foreign material adhesion preventing device according to claim 1; and
the camera main body on which the foreign material adhesion preventing device is mounted.

13. The foreign material adhesion preventing device according to claim 1, wherein
the cover, the fastener, and the nozzle are integrated into the single unit.

* * * * *